(12) United States Patent
Jeacocke et al.

(10) Patent No.: US 10,365,877 B2
(45) Date of Patent: Jul. 30, 2019

(54) SYSTEM FOR IDENTIFYING AND USING MULTIPLE DISPLAY DEVICES

(71) Applicant: DISPLAYLINK (UK) LIMITED, Cambridge (GB)

(72) Inventors: Jonathan Alexander Jeacocke, Bedford (GB); Daniel Ellis, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 7 days.

(21) Appl. No.: 15/553,685

(22) PCT Filed: Feb. 10, 2016

(86) PCT No.: PCT/GB2016/050320
§ 371 (c)(1),
(2) Date: Aug. 25, 2017

(87) PCT Pub. No.: WO2016/135441
PCT Pub. Date: Sep. 1, 2016

(65) Prior Publication Data
US 2018/0032301 A1 Feb. 1, 2018

(30) Foreign Application Priority Data
Feb. 27, 2015 (GB) .................. 1503405.1

(51) Int. Cl.
*G06F 3/14* (2006.01)
*G06F 8/38* (2018.01)
(Continued)

(52) U.S. Cl.
CPC .......... *G06F 3/1423* (2013.01); *G06F 1/1647* (2013.01); *G06F 3/017* (2013.01);
(Continued)

(58) Field of Classification Search
CPC .... G06F 1/1647; G06F 3/017; G06F 3/04883; G06F 3/1423; G06F 3/1446; G06F 8/38; G06F 9/451; G06K 9/00355
See application file for complete search history.

(56) References Cited

U.S. PATENT DOCUMENTS

2008/0211825 A1   9/2008 Sunakawa
2009/0249245 A1*  10/2009 Watanabe .............. G06F 1/1616
                                               715/802

(Continued)

FOREIGN PATENT DOCUMENTS

JP    2008281718      5/2010
WO    01/15132 A1     3/2001
WO    2016135441 A1   9/2016

OTHER PUBLICATIONS

EPO, PCT International Search Report for corresponding PCT/GB2016/050320, dated Jun. 23, 2016, pp. 1-6.
(Continued)

*Primary Examiner* — Viet D Pham
(74) *Attorney, Agent, or Firm* — Tucker Ellis LLP; Michael G. Craig

(57) ABSTRACT

Data, particularly display data, is sent to a particular peripheral device, particularly a display device) from a computer device, such as a mobile device. The method involves determining an identifier of each peripheral device and receiving (35) a user identification identifying a particular peripheral device. The user identification is then associated (36) with the identifier of the particular peripheral device, and data is sent to the particular peripheral device based on the identifier associated with the user identification. The user identification comprises a user gesture which is captured as an input image, which is processed to determine which particular peripheral device the user gesture is gesturing towards and associating the user gesture with the identifier
(Continued)

of the particular peripheral device. Alternatively the user identification may be directly input by a user on a display showing either recognised elements that have been associated with identifiers of the peripheral devices, or a listing of available peripheral devices.

18 Claims, 7 Drawing Sheets

(51) Int. Cl.
| | | |
|---|---|---|
| *G06F 1/16* | (2006.01) | |
| *G06F 3/01* | (2006.01) | |
| *G06F 3/0488* | (2013.01) | |
| *G06K 9/00* | (2006.01) | |
| G06F 9/451 | (2018.01) | |
| H04N 21/41 | (2011.01) | |
| H04N 21/4223 | (2011.01) | |
| H04N 21/431 | (2011.01) | |
| H04N 21/442 | (2011.01) | |

(52) U.S. Cl.
CPC ........ *G06F 3/04883* (2013.01); *G06F 3/1446* (2013.01); *G06F 8/38* (2013.01); *G06K 9/00355* (2013.01); *G06F 9/451* (2018.02); *G09G 2320/0693* (2013.01); *G09G 2320/08* (2013.01); *G09G 2354/00* (2013.01); *G09G 2356/00* (2013.01); *G09G 2370/042* (2013.01); *G09G 2370/16* (2013.01); *H04N 21/4122* (2013.01); *H04N 21/4223* (2013.01); *H04N 21/4312* (2013.01); *H04N 21/44218* (2013.01)

(56) References Cited

U.S. PATENT DOCUMENTS

| | | | |
|---|---|---|---|
| 2010/0328447 | A1* | 12/2010 | Watson ................. G06F 3/1446 348/135 |
| 2012/0013523 | A1 | 1/2012 | Jaynes |
| 2014/0293017 | A1 | 10/2014 | Fei et al. |
| 2014/0355819 | A1* | 12/2014 | Naruse ................. G06F 3/1423 382/103 |
| 2016/0196048 | A1* | 7/2016 | Khoury ............... G06F 3/04845 715/761 |

OTHER PUBLICATIONS

EPO, PCT Written Opinion of the International Searching Authority for corresponding PCT/GB2016/050320, dated Jun. 23, 2016, pp. 1-10.
Patents Act 1977; Search Report under Section 17 for GB1503405. 1, date of search Jul. 30, 2015.
Patents Act 1977; Search Report under Section 17 for GB1503405. 1, date of search Oct. 27, 2015.
Bodhi Linux, Default Keyboard Shortcuts, BodhiLinux.com, [online], available from: http://forums.bodhilinux.com/index.php?/topic/192-default-keyboard-shortcuts/, Jan. 9, 2011.
GitHub, "Amethyst", [online], available from: https://web.archive.org/web/20140911041041/, https://github.com/ianyh/Amethyst, "Keyboard Shortcuts," Sep. 11, 2014.

* cited by examiner

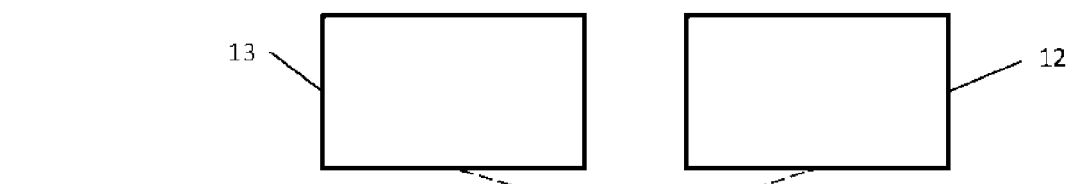
Figure 4(a)
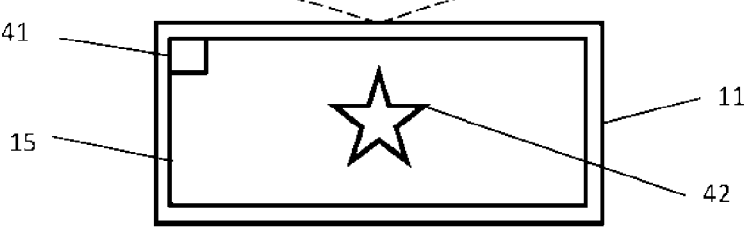
Figure 4(b)
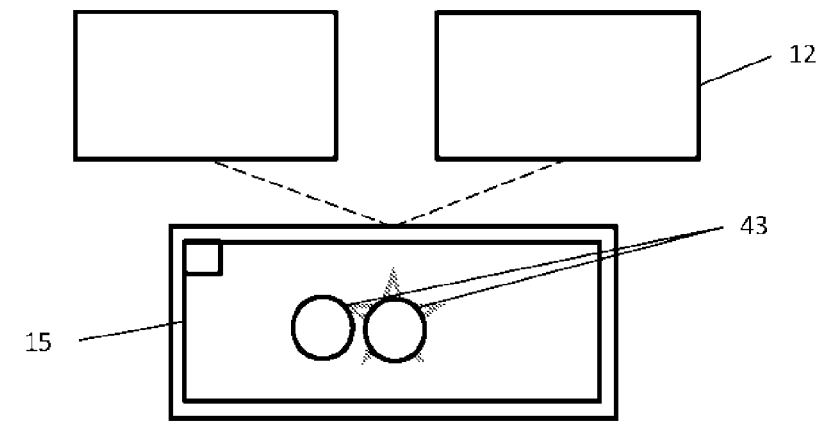
Figure 4(c)
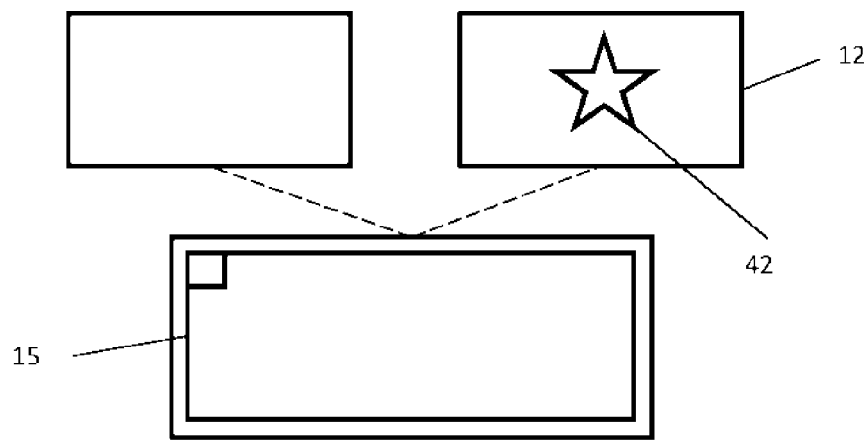

SYSTEM FOR IDENTIFYING AND USING MULTIPLE DISPLAY DEVICES

CROSS-REFERENCE TO RELATED APPLICATION

This application is a U.S. national phase of PCT Application No. PCT/GB2016/050320, filed on Feb. 10, 2016, which published as WO 2016/135441, and which claims priority to Great Britain Application No. 153405.1, filed Feb. 27, 2015, which are hereby incorporated herein by reference.

The invention relates to a method and apparatus for identifying and using multiple peripheral devices, such as, but not limited to, display devices, under the control of a computer device, such as, but not limited to, a mobile device.

Conventionally, it is possible to connect multiple display devices such as televisions, computer monitors, wearable displays, projectors or any other display device, or a combination thereof, to a single static computer device, such as a desktop PC, gaming console, DVD player etc. This is a known way of increasing productivity and improving user interaction with the computer device. However, configuration of multiple such display devices is performed through a menu interface that is often complex and may be difficult for less technically literate users.

Although a computer device may automatically detect when it has been connected to a new display device, it does not know where the display device is physically located in relation to any other display devices and the user must use the menu-based configuration screen in order to adjust this. This may be inconvenient and may also be more difficult for some users. The computer device will also not detect any changes in relative positions of the display devices, which must be input manually.

When a user runs an application on the computer device, it usually produces a visual interface of some kind. This may appear on any display device and may not appear on the display device that the user wishes. It must then be moved or, in the case of some applications, the application and display devices must be configured through further menu interfaces to ensure that the particular application image appears on the correct display device.

It is also becoming increasingly common for users to wish to use portable electronic devices such as tablet computers and notebooks or other mobile computer devices in place of static computer devices. These mobile computer devices usually have internal screens, but they can be connected to external display devices and use these alongside their internal screens. However, the same disadvantages apply as for connecting additional display devices to a static computer device as the external display devices must still be configured through a menu interface that may be especially difficult to use on a small screen such as the internal screen of a mobile device.

It is therefore an object of the present invention to overcome, or at least reduce, the above-mentioned limitations of the prior art by providing methods of identifying and configuring display devices that are more convenient than the known systems. A method of configuring the display devices may also provide the static or mobile computer device that is controlling a display device with information regarding the physical location of the display device. This can then be used in turn to provide more intuitive and customisable ways for the user to control the display devices.

Accordingly, a first aspect of the invention provides a method of identifying a plurality of peripheral devices coupled to a computer device, the method comprising:

determining an identifier of each peripheral device coupled to the computer device;

receiving at least one image showing one or more of the plurality of peripheral devices;

processing the one or more images to recognise one or more elements in the at least one image that may be a peripheral device;

determining whether a particular recognised element constitutes a particular peripheral device of the plurality of peripheral devices; and if it is determined that a particular recognised element constitutes a particular peripheral device, associating the identifier of the particular peripheral device with the constituting particular recognised element.

In one embodiment, the peripheral devices are display devices and determining whether a particular recognised element constitutes a particular peripheral device comprises:

displaying the identifiers of the peripheral devices and the recognised elements; and receiving an input indicating which recognised element should be associated with which identifier.

Preferably, the recognised elements are displayed together with unique tags and the input indicates which unique tag should be associated with which identifier.

According to an alternative embodiment, the peripheral devices are display devices and determining whether a particular recognised element constitutes a particular peripheral device comprises:

processing the at least one image to determine whether a recognised element includes a recognised unique characteristic;

determining whether the recognised unique characteristic is associated with an identifier of a particular peripheral device coupled to the computer device.

In the case where the peripheral device is a display device, the unique characteristic may comprise a characteristic obtained using Extended Display Identification Data (EDID), or DisplayID.

In one embodiment, the method includes obtaining the identifier for each peripheral device from the peripheral device. In the case where the peripheral device is a display device, the identifier may be obtained from the peripheral device using Extended Display Identification Data (EDID), or DisplayID.

The method may further comprise:

processing the at least one image to determine relative locations and/or sizes and/or orientations of the particular recognised elements constituting particular peripheral devices; and storing the relative locations and/or sizes and/or orientations of the particular recognised elements.

Preferably, the method further comprises displaying the particular recognised elements in a form indicating their relative locations and/or sizes and/or orientations.

The method thus provides a more user-friendly method for configuring peripheral devices, such a display devices, which does not require a menu interface that some users may find complex or difficult to use on a smaller screen. Because the relative locations of the peripheral devices can be recognised and stored, movement of, for example, a mouse pointer from one display device to another may be smooth and intuitive based on their relative locations. The method may also allow recognition of the relative size and orientation of display devices. As a result, it would be unnecessary for this information to be supplied to the computer device. This would mean that the display devices would require less internal processing ability and they can therefore be made smaller and more cheaply.

Preferably, the method further comprises using the inbuilt camera of a mobile computer device to provide the image. This would make use of a capability already available on the mobile device, which means it would be unnecessary for the user to find an alternative image and also makes use of the method more intuitive.

Alternately, the image could be provided by inputting symbols to represent the display devices directly through a graphical interface: for example, by drawing rectangles on a touchscreen in the appropriate positions. This would make it unnecessary for a computer device to have an inbuilt camera and would also allow for impromptu connections to peripheral devices where it may not be practical to prepare an image representation in advance.

Preferably, the method further comprises a method allowing the user to identify further peripheral devices that were not present in the original image representation: for example, where there is an additional peripheral device connected to the computer device in another location, such as in a shop window. This would allow the computer device to control peripheral devices, such as display devices, that are not located in the same place as a main display array.

Preferably, the method further comprises a method allowing the system to detect whether the computer device, such as a mobile device, has an internal screen and, if so, whether that screen is present in the image. This would allow the user to configure the position of the computer device's internal screen relative to the other display devices and would also avoid errors related to the computer device being aware of the internal screen but it not being found in the image.

Preferably, the method further comprises functionality allowing the system to detect whether the computer device has an internal screen that is not to be used as a display device. This would allow the user to ignore the presence of the internal screen during configuration and use it for another purpose, such as input, or not use it at all.

Preferably, the method further comprises a method whereby the user can correct the system if it recognises peripheral devices incorrectly. This would avoid difficulties in the case of, for example, an office environment where there may be many peripheral devices in a photograph of a user's desk, not all of which are connected to the computer device. It would be difficult and annoying for the user if some or all of his or her display devices were incorrectly configured because the system did not correctly recognise them and functionality allowing the user to correct the system during configuration would avoid the need to use the known menu interface.

Preferably, the method further comprises the display of a known graphical indication on the screens of all the display devices to which the computer device is connected such that the known graphical indication will appear in the image representation. By providing such a known graphical indication, the system will be able to detect appropriate display devices more accurately and it may be unnecessary for the user to correct the system, thus making configuration faster and more convenient as well as allowing the system to test that the display devices are working correctly. For example, if the image is provided by the internal camera of a mobile device, the system might require the user to take one photograph of his or her display device array, wait for the system to display a rectangle around the edge of each display device, and then take a second photograph. The system could then use the positions of the rectangles to identify the display devices and avoid errors in identification by comparing the two photographs.

Advantageously, the method further comprises functionality whereby the configuration of the display devices may be updated automatically. By providing this functionality, it will be possible for the user to change the arrangement of his or her display devices without having to reconfigure his or her system.

Preferably, if the computer device is disconnected from the display devices, the system should store the configuration settings in non-volatile memory. This will allow the user to disconnect and reconnect the computer device without needing to configure the system every time, which will allow for faster and more convenient use.

According to one embodiment, there is provided a method for identifying specific display devices for use in displaying specific image data, the method further comprising:

causing one or more of the display devices to display at least one known indicator;

determining whether the at least one known indicator is visible on a recognized element in the at least one image;

if it is determined that the at least one known indicator is visible on a recognised element, determining that the recognised element constitutes a possible peripheral device.

Preferably, the known indicator may be a predetermined graphical indication. Preferably, each of the display devices is caused to display a unique known indicator and, if a unique known indicator is determined to be visible in the at least one image on a particular recognized element, determining that the particular recognized element constitutes a particular display device which has been caused to display the particular unique known indicator.

Alternatively, each of the display devices is caused to display a known indicator in turn and at least one further image is received after each display device is caused to display the known indicator to determine whether the known indicator is visible in the at least one further image on a particular recognized element, and, if the known indicator is visible on a particular recognized element, determining that the particular recognized element constitutes a particular display device which has been caused to display the known indicator.

According to a second aspect of the invention, there is provided a method of sending data to a particular peripheral device of a plurality of peripheral devices coupled to a computer device, the method comprising:

determining an identifier of each peripheral device coupled to the computer device;

receiving a user identification identifying a particular peripheral device;

associating the user identification with the identifier of the particular peripheral device; and sending data to the particular peripheral device based on the identifier associated with the user identification.

Preferably, the user identification is assigned to the particular peripheral device by the user. The user identification may be input by a user on a display showing recognised elements that have been associated with identifiers of the peripheral devices. The display showing recognised elements is preferably displayed on a touch sensitive screen and the user identification comprises a user gesture on the touch sensitive screen.

In one embodiment, the user identification is input by a user on a display showing the peripheral devices that are coupled to the computer device, the display indicating a listing of available peripheral devices in an order determined by the computer device.

The user identification preferably comprises a user gesture which is captured as an input image by an image input device, the method further comprising processing the input image to determine which particular peripheral device the user gesture is gesturing towards and associating the user gesture with the identifier of the particular peripheral device.

If desired, the method may further comprise requiring a user to confirm that the particular peripheral device is correct before the data is sent.

In a preferred embodiment, at least one of the peripheral devices comprises a display device and data sent to the display device is display data. Preferably, at least one of the peripheral devices comprises a display device that is integral with the computer device.

This method is beneficial because it allows the user to select a specific display device based on a user identification that may be connected to any user input or inputs appropriate to the specific embodiment. This is not only more convenient, but may be useful for a user who has difficulty with conventional input methods such as a mouse or touchscreen.

Preferably, the method further comprises a method for the user to assign his or her own user identifications and selection methods to the display devices recognised by the system. This will allow the user to use intuitive labels and will also permit different symbols and gestures to allow for different methods of input.

Preferably, the method further comprises a method whereby the user identifications and selection methods assigned to the display devices need not all use the same method of input. For example, one display device might be identified using a graphical symbol drawn by the user with a stylus while another is identified using a specific eye movement. This will allow the user to assign methods of identification that are appropriate to the circumstances and the nature and locations of the display devices.

Preferably, the method further comprises a method for assigning order to the display devices regardless of the form of user identification used. This will allow for automatic selection of a display device based on order, which means that while the user can select a specific display device, he or she need not do so. This is more convenient for the user. Ordering of the display devices will also allow for the use of a menu interface where the display devices are listed such that they can be individually selected by the user.

Preferably, the method further comprises a method for changing an assigned order during use of the display devices. This would make an embodiment in which the next display device in order is suggested more useful as it would allow for a first-in-first-out system, for example, meaning that the user's most-recently-accessed display will not be hidden by the next display sent to a display device.

Preferably, the method requires a specific activation in order to prevent the user from sending an application to a display device accidentally. The activation may take any form or may also be configured by the user to take advantage of the methods of input available to the user and take account of any special requirements of the user.

According to a third aspect of the invention, there is provided a method of identifying and using display devices attached to a computer device comprising:

connecting one or more display devices to a computer device;

identifying the display devices according to the first aspect of the invention; and sending display data to the display devices according to the second aspect of the invention.

This combination of the methods of the first and second aspects of the invention is beneficial because it allows the configuration of the display devices and selection of identifications to be done in a single step.

Preferably, the method further comprises a method for detecting and storing the locations of the display devices relative to the location at which the image representation was produced. By providing this functionality, the system will allow for gestures to be used to select specific display devices based on the physical location of the user.

According to another aspect of the invention, there is provided a display control device arranged to carry out any of the aforementioned methods in any combination and comprising:

an input mechanism through which the display control device can receive display data from a connected computer device;

optionally, an input mechanism through which the display control device can receive a signal activating the method, such as a button;

an input mechanism through which the display control device can receive other user input indicating a selected display device. This may be a method of input provided on the display control device such as a button, or it may be a further data input through which the display control device is able to receive signals from the computer device; the data may be in the form of packet headers on the display data;

a direction engine which may be arranged so as to interpret signals received from the second input mechanism and direct the display data received through the first input mechanism to the selected display device;

optionally, a processor arranged to convert data formatted for a general-purpose connection to a format suitable for a display-specific connection;

two or more outputs through which the display control device can transmit display data to two or more display devices.

This display control device may be a separate device to which display devices and a computer device are connected, or it may be integral to a display device or a computer device.

Embodiments of the invention will now be more fully described, by way of example only, with reference to the drawings, of which:

FIG. 4 shows how the system may be used to send an image to a specific display device.

Figure 1:
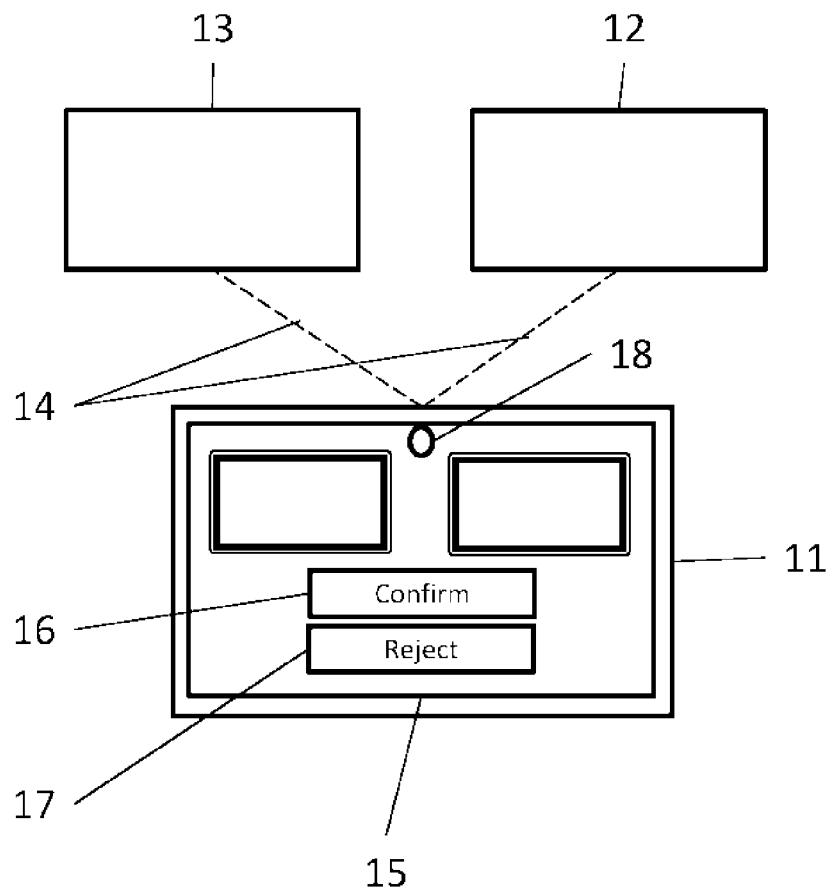
FIG. 1 shows an example embodiment of the invention in which a tablet computer is connected to two external display devices.
Figure 2:
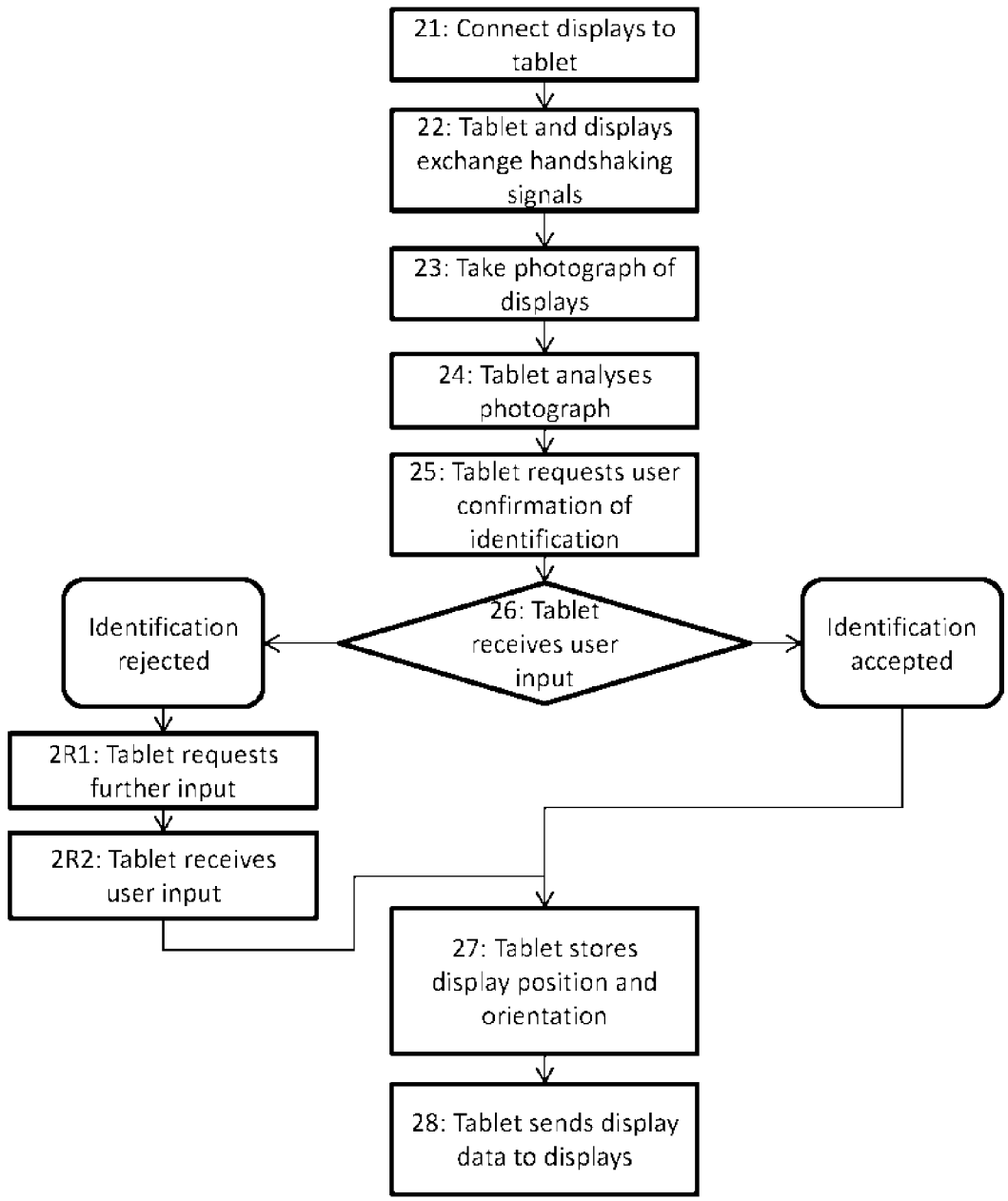
FIG. 2 is a flowchart showing the process of the configuration of the example system of FIG. 1 according to a first embodiment of the invention
Figure 3:
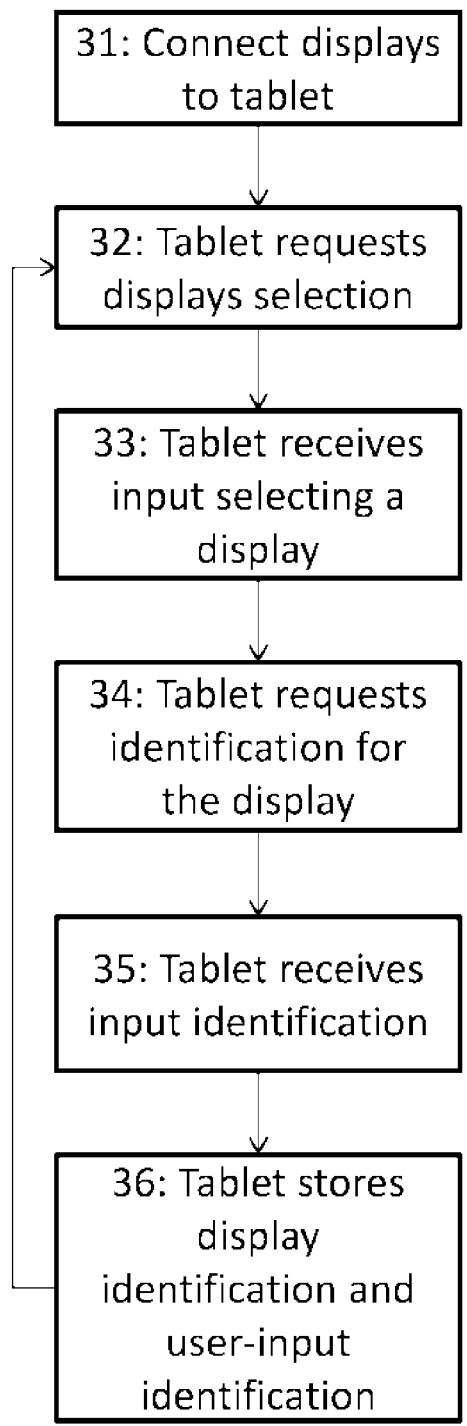
FIG. 3 is a flowchart showing the process of configuring the example system of FIG. 1 according to a second embodiment of the invention

In the embodiment shown in FIGS. 1, 2 and 3, the computer device [11] is a tablet computer which is connected (Step 21) to two external display devices, such as monitors [12, 13] in a monitor array of the type that may be used for a desktop, a home entertainment system or multiple screens in a restaurant showing different television programs, while also having its own internal screen [15] and an internal camera. The internal screen [15] is a touchscreen and the user can interact with the tablet computer [11] by tapping or dragging a finger on the internal screen [15]. The tablet computer [11] is also provided with an internal camera [18]. The connections [14] between the tablet computer [11] and the monitors [12, 13] may be wired, via USB, VGA, HDMI or any other suitable wired connection; or it may be wireless via a local connection such as Wi-Fi, or a wide-range connection such as the Internet, or any other suitable wireless connection.

At Step 22, as part of the connection process, the tablet computer [11] and the monitors [12, 13] exchange handshaking signals as is appropriate to the particular connection [14]. As part of this exchange, the tablet computer [11] will discover how many monitors [12, 13] are attached and their resolutions, but will not be aware of their locations relative to one another or their orientations. The tablet computer [11] may, at this time, or later, obtain from each connected monitor, information about the characteristics of that monitor, for example using Extended Display Identification Data (EDID), or DisplayID.

At Step 23, the user uses the internal camera of the tablet computer [11] to take a photograph of the monitors [12, 13]. At Step 24, the tablet computer [11] analyses the photograph, in this embodiment simply looking for parts of the image that resemble a pre-programmed template for a monitor, for example based on the characteristics determined from the EDID or DisplayID data. It will find all the most likely parts of the photograph, rank them in order of resemblance to a monitor and choose the two best possibilities, knowing that there are two monitors. More than two possibilities could be chosen to provide greater options in case one of the chosen possibilities is found to be incorrect. If the possibilities can be determined with some confidence measure, then a number of possibilities can be chosen according to the confidence measures. For more or fewer monitors, an appropriate number of possibilities may be chosen.

At Step 25, the analysed photograph is displayed on the internal screen [15] for the user's approval with the possible monitors highlighted to allow the user to see what the system has recognised as a possible monitor. In this embodiment, the tablet computer further displays two soft buttons [16, 17] requesting input from the user. If the tablet computer [11] has correctly identified the monitors [12, 13], the user can confirm this with the appropriate button [16] and the process goes directly to Step 27. Otherwise, the user can reject it and the tablet computer [11] will request further input at Step 2R1.

At Step 2R1, the tablet computer [11] could display an unanalysed version of the photograph taken earlier, or alternatively it could highlight all the possible monitors that it found and give the user the option to choose the two correct parts of the image. It then receives the input indicating the correct monitors [12, 13] at Step 2R2. It treats these in the same way as the monitors it found through its own analysis, moving on to Step 27.

At Step 27, the tablet computer [11] stores the correct positions and orientations of the monitors [12, 13] and configures display and interaction such as mouse movement accordingly. It then sends display data to the monitors [12, 13] in the conventional way (Step 28).

FIG. 3 shows a different method of configuring the system shown in FIG. 1. In this embodiment, the monitors [12, 13] have not been configured as described above, but have been connected to the tablet computer [11] in the normal way. This occurs at Step 31.

At Step 32, the tablet computer [11] requests input from the user selecting a monitor [12, 13] to be configured. In an alternative embodiment, the tablet computer [11] could enter a configuration mode and select each monitor [12, 13] in turn automatically and not request any input from the user at this stage.

At Step 33, the tablet computer [11] receives input from the user selecting an individual monitor [12, 13]. The tablet computer [11] then requests further input at Step 34. This input will form the identification associated with the selected monitor [12, 13]. The tablet [11] receives the identification input at Step 35 and stores an internal identifier of the monitor [12, 13] and the user's chosen identification of the Monitor [12, 13] at Step 36.

Steps 32-36 are then repeated for the other monitor [12, 13].

FIG. 4 shows the use of the above described method, using the same system comprising two monitors [12, 13] connected to a tablet computer. The monitors [12, 13] have been configured according to the process described with reference to FIG. 3. In this example, the assigned identifications for the monitors [12, 13] were a single tap on the tablet computer's internal touchscreen [15] for the left-hand monitor [13] and a double tap for the right-hand monitor [12].

As shown in FIG. 4(a), the user activates the system using a soft button [41] displayed on the internal screen [15]. The image [42] to be displayed on the chosen monitor [12, 13] is shown on the internal screen [15] of the tablet computer [11].

As shown in FIG. 4(b), the user selects one of the monitors [12, 13]. In this example, he or she indicates that he or she wishes to use the right-hand monitor [12] by tapping the internal touchscreen [15] twice. In FIG. 4(b), this is indicated by two circles [43]. In FIG. 4, the circles [43] are shown next to one another for clarity, but the relative locations of the two taps on the internal screen [15] do not matter.

In FIG. 4(c), the displayed image [42] is shown moved from the internal screen [15] to the right-hand monitor [12].

Figure 5A:
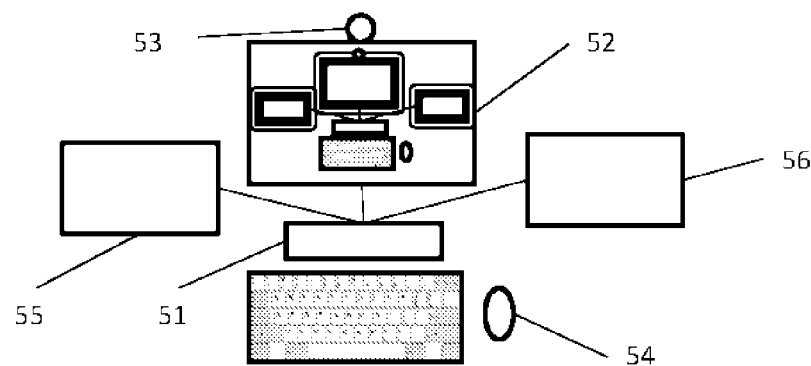
FIG. 5 shows an example embodiment of the invention in which a static desktop computer is connected to a single main display and two external displays.
Figure 5B:
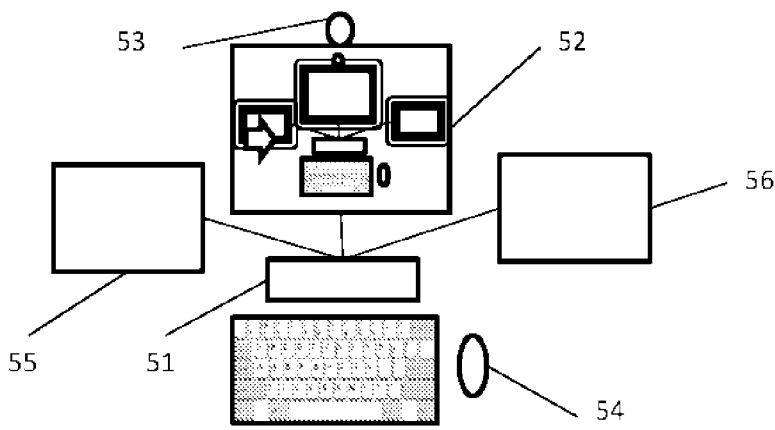
Figure 5C:
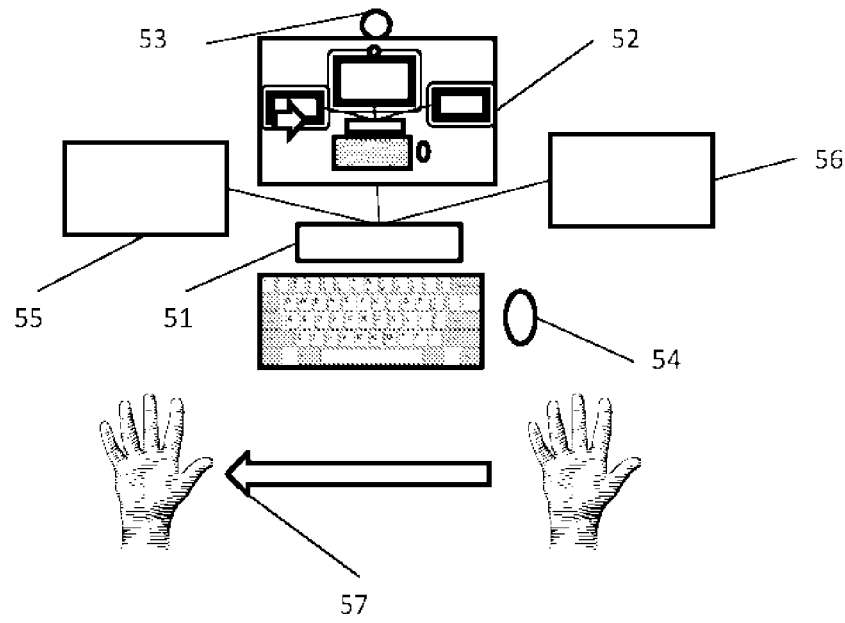
Figure 6:
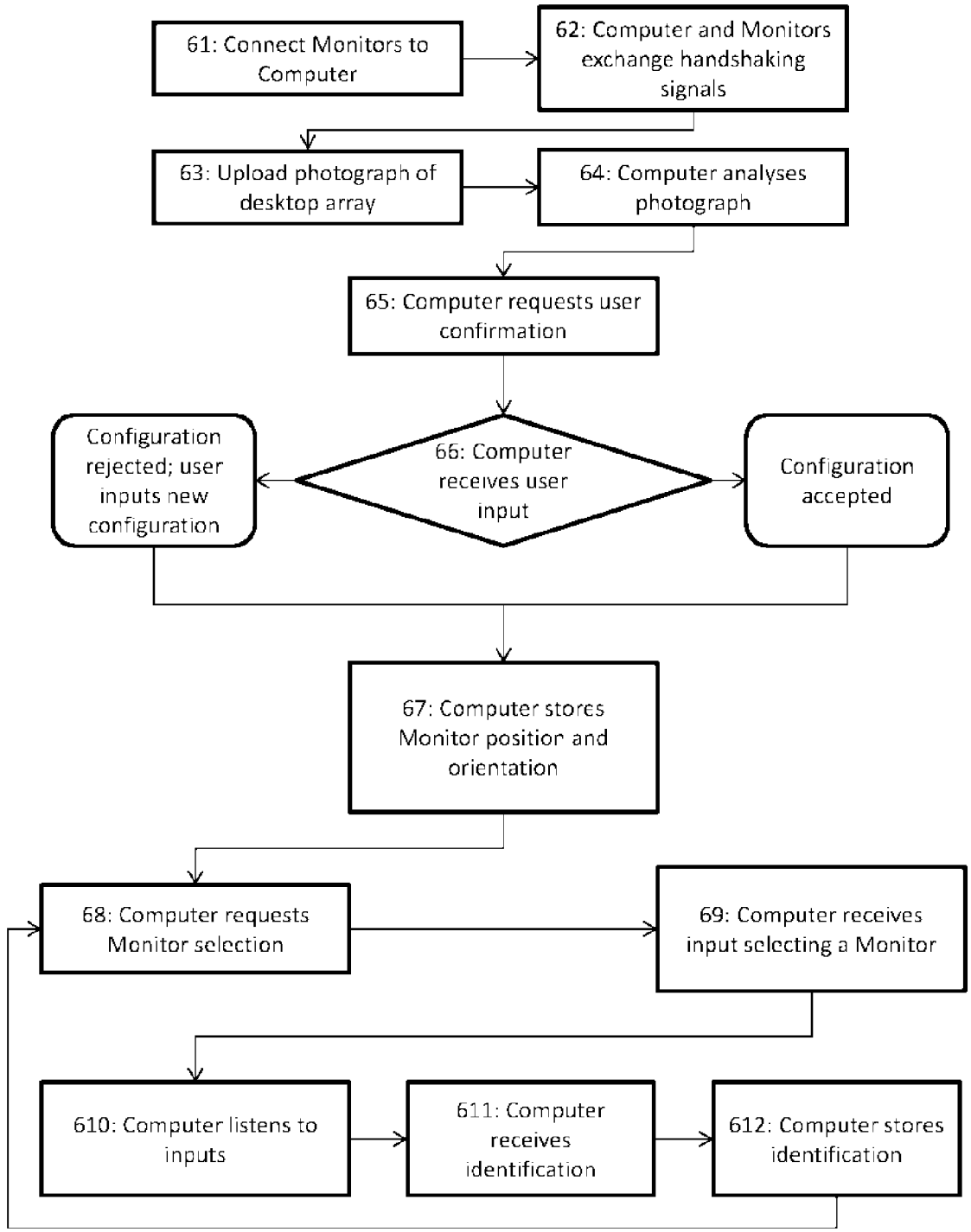
FIG. 6 is a flowchart showing the process of configuring the example system of FIG. 5 according to a third embodiment of the invention

In a further embodiment shown in FIGS. 5, 6 and 7, the computer device is a standard desktop computer [51] which is connected to a single main monitor [52] and two secondary monitors [55, 56]. The computer [51] is provided with a mouse [54] and keyboard and also a video camera [53] that is observes the user. The computer [51] and camera [53] also have motion capture capabilities that allow them to record and interpret the user's movements.

FIG. 5 shows the process of configuring the three monitors [52, 55 and 56], FIG. 6 outlines the process, showing how the above-described methods can be combined, using this embodiment as an example, and FIG. 7 shows the process of sending a particular image to an appropriate monitor.

At Step 61, the monitors are connected to the computer [51] and they exchange handshaking signals and information appropriate to the connection at Step 62.

As shown in FIG. 5(a), the user uploads an image of his or her desktop arrangement to the system (Step 63). The computer [51] analyses the photograph as hereinbefore described and identifies the parts of the image that are most likely to be the three monitors [52, 55, 56] to which it is connected. It displays the image on the main monitor [52] with the three monitors [52, 55, 56] highlighted. It then requests user confirmation that the detection of the monitors [52, 55, 56] is correct. In this embodiment, the system has not automatically assigned ordering or numbers to the monitors [52, 55, 56]. The user is able to confirm the results of the automatic detection or he or she could reject them and input a correction as hereinbefore described. In either case, the computer [51] then stores the locations of the monitors [52, 55, 56] relative to each other and the location from which the image was produced, as well as their orientations (Step 67).

At Step 68, without requiring any further input from the user to enter the part of the process where the monitors [52, 55, 56] are assigned identifications, the computer requests input to select a monitor [52, 55, 56] for configuration. In this embodiment, as shown in FIG. 5(b), the user uses the mouse [54] and cursor to click on the representation of the left-hand monitor [55] that is highlighted in the image displayed on the main monitor [52] (Step 69). This input sends a signal to the system notifying it that the user will now input a chosen identification for that monitor [55] and the computer listens to all sources of input, including the camera [53] (Step 610).

As shown in FIG. 5(c), the user gestures with a hand from right to left [57]. This movement is recognised by the camera [53] at Step 611 and the system requests approval to assign a movement of the hand from right to left [57] as the identification for the left-hand monitor [35]. When the user approves, that gesture [57] is assigned to the left-hand monitor [55] (Step 612). The process shown in FIGS. 5(b) and 5(c) and Steps 68-612 are then applied to identify the other two monitors [52, 56] in turn, assigning a different gesture to each: for example, pointing forward to identify the main monitor [52] and gesturing from left to right to indicate the right-hand monitor [56]. Though in this example the user assigns hand gestures to all three monitors [52, 55, 56], he or she could use a variety of methods of identification. For example, he or she could assign a hand gesture to the left-hand monitor [55] as described, a voice command to the main monitor [52] and a key combination to the right-hand monitor [56].

FIG. 7 shows an example of how the user, having configured the system as described above with reference to FIGS. 5 and 6, could send a displayed image to a specific monitor [52, 55, 56]. In this example, the focus is on a window [71] on the main monitor [52] and the user wishes to send this display to the right-hand monitor [56].

Figure 7A:
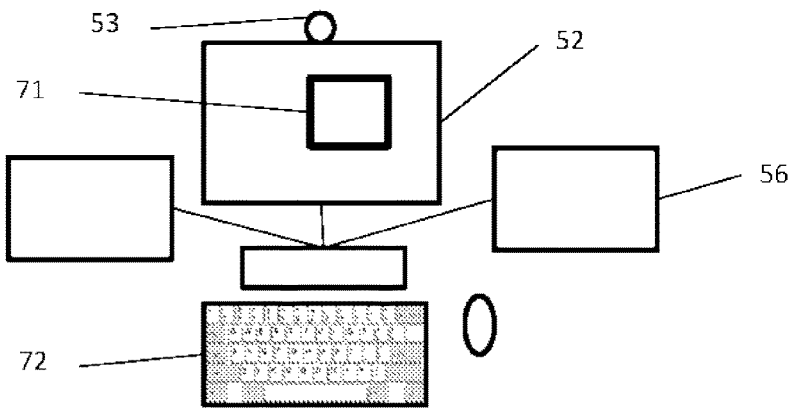
FIG. 7 shows the use of the system to send an image to a specific display device in the example system of FIG. 5.

As shown in FIG. 7(a), the user activates the system using a combination of key presses on the keyboard [72]. This will turn on the camera [53] so that it watches for the gestures that the user assigned during configuration of the system.

Figure 7B:
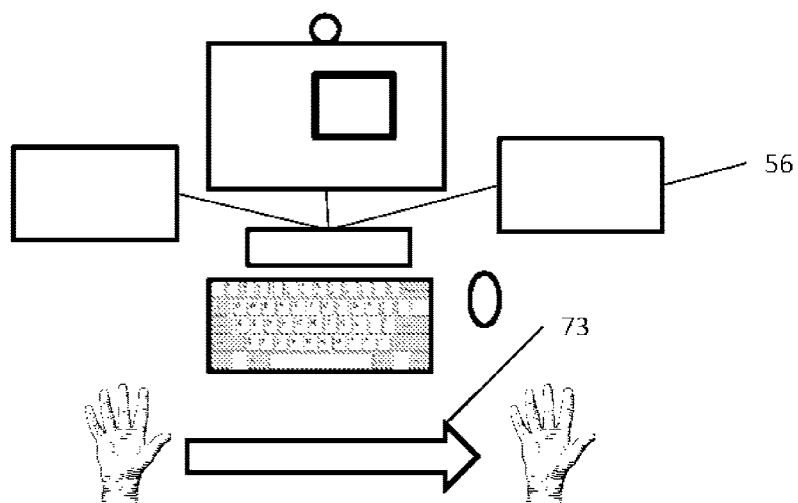

As shown in FIG. 7(b), the user gestures with a hand from left to right [73], which is the gesture assigned to the right-hand monitor [56]. This gesture is seen and identified by the system. The computer [51] automatically receives a signal to stop displaying the window [71] on the main monitor [52] and instead display it on the right-hand monitor [56].

Figure 7C:
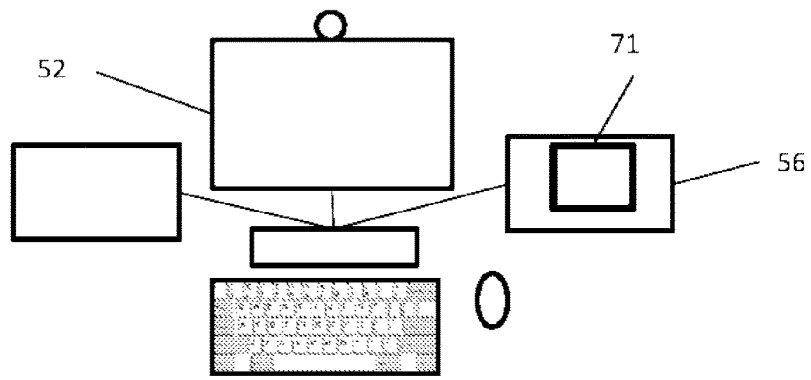

As shown in FIG. 7(c), the computer [51] has altered its display so that the selected window [71] has moved from the main monitor [52] to the right-hand monitor [56].

Each of these embodiments is by way of example only and does not limit the scope of the invention, which is defined by the attached claims.

It will be appreciated that although only a few particular embodiments of the invention have been described in detail, various modifications and improvements can be made by a person skilled in the art without departing from the scope of the present invention, defined by the attached claims.

Alternative embodiments will now also be described by way of further example, which do not limit the scope of the claims. They may be combined with other embodiments in the same or other categories.

FIGS. 1-4 show an embodiment in which the computer device is a mobile with an inbuilt screen. This screen does not appear in the image representation, since the mobile is being used to create the image representation, but it can still be used as a monitor. An alternative embodiment would be a computer device with an inbuilt screen that appears in the image representation, for example if the user was inputting the image representation from another source (as in the embodiment used in FIGS. 5-7) or drawing it directly onto the screen.

Another possible embodiment would be a mobile whose internal screen is a touchscreen that the user does not intend to use as a monitor. For example, the mobile might be a tablet computer with a touchscreen that will be used only as a trackpad for controlling the external monitors. In this embodiment, the system might use the internal screen during configuration, to allow the user to approve the recognition of monitors in the image representation and assign or approve identifications. The internal screen would not be recognised or identified and once configuration is complete it might be turned off. Alternatively, the internal screen might not be used for configuration at all and any configuration screen might be shown on one of the external monitors.

Identification and assignment of labels for selection can be by any appropriate method, as long as the computer device is capable of accepting input in that form. This may include, for example, mouse clicks, clicking and dragging, tapping and/or dragging on a touchscreen, assigning a graphical symbol to a display, key combinations, movements with a handheld computer device, voice commands, eye movements, gestures with a hand, or anything else that may occur to the reader, including new methods of input that may be developed in future.

Identification and assignment of labels may also be performed automatically by the invention or the invention may detect and use a label assigned to a monitor at manufacture.

Optionally, the monitors can be assigned an order, either automatically by the invention or by the user. An example of an embodiment using this ordering is an embodiment in which the user does not directly choose which monitor to use for a display. For example, the system might have an option for the choice of monitor to be automatic. In this case the user could activate the system, for example by pressing a button, and the image would be automatically sent to the next monitor in order.

Alternately, the system may simply suggest the next monitor in order and the user can either use one form of activation to use that monitor or use some additional or alternative input to select a different monitor. Optionally, this could then change the ordering of the monitors such that the least-recently-used monitor is the next suggested regardless of the original ordering of the monitors.

Examples of how order might be automatically assigned include ordering from left to right in the image representation, recording the order in which monitors were connected to the computer device, or any other appropriate method.

The system may also be activated using any appropriate method of input, depending on what is most appropriate for the specific embodiment. For example, where a software embodiment of the invention has been installed on a computer device after manufacture, it is likely to be appropriate to include a software method of activation. This may be in the form of a menu option, a voice command, a movement with a handheld mobile, a button appearing on the internal screen of a mobile, or any other appropriate method.

Alternatively, if the computer device is manufactured with a view to being able to utilise such methods, an activation button could be implemented in hardware on the computer device. For example, a mobile might include a power button, volume buttons and an activation button for the methods.

Alternatively, if the computer device is connected to the monitors via a docking station, there might be a button or other method of input on the docking station.

In an alternative embodiment, the identification of the monitors might be arranged such that the user could not select a monitor by accident and no special activation of the system would be necessary.

Selection of a monitor to which to send a display may be by any appropriate method or combination of methods.

In one example embodiment, the user might select a display by activating the system and then replicating the identification of the display, be that a hand gesture, a number of taps on a touchscreen, a voice command or any other identification method.

In a further alternative embodiment, the user might open a menu and select the monitor he or she wishes to use, whereupon the display is sent to that monitor without further input from the user.

An example of a combination of selection methods is an embodiment where the next monitor in a pre-decided order is suggested to the user and, for example, he or she can press a button once to use that monitor or press and hold the button in order to access a menu and select a (different) specific monitor.

The behaviour of an image sent to a specific monitor may also be different depending on the specific embodiment.

In one embodiment, a mobile with an internal screen on which application windows are usually shown full-screen may be connected to a standard external monitor. The user may wish to display anything sent to the monitor full-screen as it was on the internal screen of the mobile. In a slightly different embodiment, the monitor is instead a touchscreen with which the user can interact directly. The user may wish to send application output to this monitor in windows such that it can be moved and positioned on the monitor.

In another embodiment, a computer device, such as a laptop or a desk top computer with a main display is connected to external monitors as in FIGS. 5-7. Application windows are displayed on the main display in the conventional manner. As with a mobile, the user may wish these to be displayed full screen when they are sent to an external monitor or may wish them to remain in window form. In one embodiment, the size and aspect ratio of the window may change when it is moved to another monitor, such that it occupies the same proportion of space on the screen. Alternatively, it may simply be scaled such that if the monitor to which it has been moved is smaller the display will at maximum occupy the whole screen.

The invention claimed is:

1. A method of sending data to a particular peripheral device of a plurality of peripheral devices coupled to a computer device, the method comprising:
   displaying an element representing each peripheral device on a touch sensitive screen of the computer device, each element having been associated with an identifier for the respective peripheral device;
   receiving a user gesture on the touch sensitive screen identifying a particular element representing a particular peripheral device;
   associating the user gesture with the identifier of the particular peripheral device;
   displaying an application window on the touch sensitive screen;
   receiving the user gesture on the touch sensitive screen;
   determining the identifier of the particular peripheral device associated with the user gesture; and
   sending application output associated with the application window to the particular peripheral device based on the determined identifier associated with the user gesture.

2. The method of claim 1, wherein the display indicates a listing of available peripheral devices in an order determined by the computer device.

3. The method of claim 1, the method comprising, prior to displaying an element:
   connecting one or more peripheral devices to the computer device;
   identifying the one or more peripheral devices by:
      receiving at least one image which may show one or more of the plurality of peripheral devices;
      processing the at least one image to recognise one or more elements in the at least one image that may be a possible peripheral device;
      determining that a particular recognised element constitutes a particular peripheral device; and
      associating the identifier of the particular peripheral device with the constituting particular recognised element.

4. The method of claim 3, wherein the peripheral devices are display devices and wherein determining whether a particular recognised element constitutes a particular peripheral device comprises:
   displaying the identifiers of the peripheral devices and the recognised elements; and
   receiving an input indicating which recognised element should be associated with which identifier.

5. The method of claim 4, wherein the recognised elements are displayed together with unique tags and the input indicates which unique tag should be associated with which identifier.

6. The method of claim 3, further comprising obtaining the identifier for each peripheral device from the peripheral device.

7. The method of claim 3, wherein determining whether a particular recognised element constitutes a particular peripheral device comprises:
   processing the at least one image to determine whether a recognised element includes a recognised unique characteristic;
   determining whether the recognised unique characteristic is associated with an identifier of a particular peripheral device coupled to the computer device.

8. The method of claim 3, further comprising:
   processing the at least one image to determine relative locations of the particular recognised elements constituting particular peripheral devices; and
   storing the relative locations of the particular recognised elements.

9. The method of claim 8, further comprising displaying the particular recognised elements in a form indicating their relative locations.

10. The method of claim 3, further comprising:
processing the at least one image to determine sizes and/or orientations of the particular recognised elements constituting particular peripheral devices; and
storing the sizes and/or orientations of the particular recognised elements.

11. The method of claim 10, further comprising displaying the particular recognised elements in a form indicating their sizes and/or orientations.

12. The method of claim 3, wherein the peripheral devices are display devices, and the method further comprises:
causing one or more of the display devices to display at least one known graphical indication;
determining whether the at least one known indicator is visible on a recognized element in the at least one image;
if it is determined that the at least one known indicator is visible on a recognised element, determining that the recognised element constitutes a possible peripheral device.

13. The method of claim 12, wherein each of the display devices is caused to display a unique known indicator and, if a unique known indicator is determined to be visible in the at least one image on a particular recognized element, determining that the particular recognized element constitutes a particular display device which has been caused to display the particular unique known indicator.

14. The method of claim 12, wherein each of the display devices is caused to display a known indicator in turn and at least one further image is received after each display device is caused to display the known indicator to determine whether the known indicator is visible in the at least one further image on a particular recognized element, and, if the known indicator is visible on a particular recognized element, determining that the particular recognized element constitutes a particular display device which has been caused to display the known indicator.

15. The method of claim 3, further comprising:
determining whether there are any identifiers of a peripheral device coupled to the computer device that have not been associated with a recognised element;
displaying the identifier of any peripheral device coupled to the computer device that has not been associated with a recognised element; and
receiving an input indicating a location of the peripheral device coupled to the computer device whose identifier has not been associated with a recognised element relative to one or more of the particular recognised elements.

16. The method of claim 3, further comprising:
receiving an input indicating that an identifier that has been associated with a particular recognised element should not be so associated; and
disassociating the indicated identifier from the particular recognised element.

17. A computer device coupled to a plurality of peripheral devices, the computer device configured to
display an element representing each peripheral device on a touch sensitive screen of the computer device, each element having been associated with an identifier for the respective peripheral device;
receive a user gesture on the touch sensitive screen identifying a particular element representing a particular peripheral device;
associate the user gesture with the identifier of the particular peripheral device;
display an application window on the touch sensitive screen;
receive the user gesture on the touch sensitive screen;
determine the identifier of the particular peripheral device associated with the user gesture; and
send application output associated with the application window to the particular peripheral device based on the determined identifier associated with the user gesture.

18. The computer device of claim 17, comprising any one of:
a mobile device;
a control device incorporated in a peripheral device; or
a control device incorporated in a docking station.

* * * * *